May 23, 1967 B. G. BRAY ET AL 3,320,753
SEPARATION OF HYDROGEN SULFIDE FROM ADMIXTURE
WITH HYDROCARBON GAS
Filed March 27, 1964

INVENTORS
BRUCE G. BRAY
GEORGE W. SWIFT
BY
Henry W. Huth
ATTORNEY

United States Patent Office 3,320,753
Patented May 23, 1967

3,320,753
SEPARATION OF HYDROGEN SULFIDE FROM ADMIXTURE WITH HYDROCARBON GAS
Bruce G. Bray, Ponca City, Okla., and George W. Swift, Lawrence, Kans., assignors to Continental Oil Company, Ponca City, Okla., a corporation of Delaware
Filed Mar. 27, 1964, Ser. No. 355,223
12 Claims. (Cl. 62—28)

This invention relates to the sweetening of sour hydrocarbon gases; more particularly it relates to low temperature separation of hydrogen sulfide from admixture with normally gaseous hydrocarbon.

Natural gas and refinery gas are now widely used as sources of energy and as raw materials for petrochemical production. These gases as obtained normally are sour, i.e. contain hydrogen sulfide in objectionable amounts; some carbon dioxide is commonly also present. Hydrogen sulfide presents a pipeline corrosion and an odor problem; strict limitations have been placed on the $H_2S$ content of natural gas which is to be transported by pipelines—not more than 0.25 grain per 100 standard cubic feet of gas. Gas for petrochemical end-use must in many instances be even purer with respect to hydrogen sulfide.

Several processes are known for separating hydrogen sulfide from admixture with normally gaseous hydrocarbons, e.g., the amine process and the hot carbonate process. The present versions of the hot carbonate process are limited to feeds containing relatively small amounts of hydrogen sulfide. The amine process can handle large contents of hydrogen sulfide but the cost of operation increases rapidly with increasing $H_2S$ content.

The hydrogen sulfide recovered can be used as a source of $SO_2/SO_3$ for sulfuric acid manufacture. However, when elemental sulfur is desired, the hydrocarbon content of the hydrogen sulfide feed to a catalytic reduction process must be below about 5 mole percent. A low hydrocarbon content is also desired for chemical usage of hydrogen sulfide.

Low temperature processing of sour natural gas to separate hydrogen sulfide is known. These processes have complications in the separation operation itself or require after-separation of the hydrogen sulfide stream to decrease the hydrocarbon content.

An object of the invention is a simple process for separating hydrogen sulfide from sour hydrocarbon gas—specifically a low temperature process—containing substantial, and even major, amounts of $H_2S$. Another object is such a low temperature process which produces directly a hydrogen sulfide product of low hydrocarbon content. Other objects will become apparent in the course of the detailed description of the invention.

The single figure shows an embodiment of the process of the invention.

Briefly, in one process of the invention hydrogen sulfide is separated from a normally gaseous hydrocarbon in a feed gas mixture, such as, a sour natural gas or refinery gas, which feed gas mixture contains at least 5 mole percent of $H_2S$ and is essentially free of water vapor; the feed gas is cooled to a temperature in the range of about $-40°$ F. to about $-120°$ F. at an elevated pressure such that a gaseous hydrocarbon-liquid hydrogen sulfide system is produced; the liquid hydrogen sulfide rich phase which is formed is separated from the gaseous hydrocarbon phase, which gaseous phase has a hydrogen sulfide content lower than that of the feed gas; and the gaseous hydrocarbon is distilled to produce an overhead hydrocarbon fraction having a hydrogen sulfide content substantially lower than that of the gaseous hydrocarbon phase.

In another embodiment of the process of the invention hydrogen sulfide is separated from a feed gas mixture containing at least about 5 mole percent of hydrogen sulfide and being essentially free of water vapor. This feed gas, and cycle gas, if any, is cooled to a temperature in the range of about $-40°$ F. and about $-115°$ F. at a substantially constant elevated pressure, preferably the same as the pressure of said feed gas, to obtain a first gaseous hydrocarbon phase having hydrogen sulfide content lower than that of the gas charged and a first liquid hydrogen sulfide phase, which phases are then separated. The first liquid hydrogen sulfide phase is brought to a temperature in the range of about $-50°$ F. and about $-120°$ F. at a pressure of at least about 200 p.s.i.a., said pressure being lower than the pressure in said first cooling operation, to obtain a second liquid hydrogen sulfide phase and a second gaseous hydrocarbon phase; the second gaseous hydrocarbon phase may be cycled to said feed gas and the intermingled gas charged to the first cooling operation. The gaseous hydrocarbon phase is distilled under conditions to produce an overhead gas fraction having a hydrogen sulfide content lower than said gaseous hydrocarbon phase and a bottoms fraction having a hydrogen sulfide content greater than said gaseous hydrocarbon phase.

The invention is described in connection with the figure which forms a part of this specification. It is to be understood the figure is diagrammatic in nature as the individual items of process equipment can be readily compiled and arranged by any one of ordinary skill in this art.

The feed gas is a mixture of hydrogen sulfide and at least one normally gaseous hydrocarbon, usually methane. Pipeline natural gas normally includes methane and ethane hydrocarbons. The as produced natural gas may include methane, ethane, propane and appreciable amounts of butanes and pentanes. In addition to the hydrogen sulfide, carbon dioxide and some nitrogen is frequently present. Refinery gas includes in addition to the saturated hydrocarbons, substantial amounts of unsaturated hydrocarbons. In general refinery fuel gas will have been fractionated to remove the $C_4$ and higher hydrocarbons and substantially all of the $C_3$ hydrocarbons. Normally the feed gas mixture contains methane as the major hydrocarbon constituent.

In this process, the feed gas mixture contains at least about, and preferably above 5 mole percent of hydrogen sulfide. Mixtures containing as much as 90 mole percent of $H_2S$ are known and these may be charged to the process. More commonly feed gases contain about 5–60 mole percent of $H_2S$; the process is particularly adapted for feeds containing, above about 10 mole percent, e.g., about 10–60 mole percent of hydrogen sulfide.

In order to avoid clogging of heat exchangers by water freezeout or hydrates it is necessary that the feed gas be essentially free of water; preferably that it have a water dew point below $-100°$ F. which corresponds to less than 1 part per million of water vapor present. In general a water dew point between about $-100°$ F. and $-120°$ F. is suitable.

Feed gas from source 10 at elevated pressure is passed by way of line 12 to dehydration operation 14 where its dew point is lowered to about $-100°$ F. to $-125°$ F.

Dehydrator 14 may be any form of operation which will give the desired dew point, for example a conventional combination of glycol dehydration and solid adsorption or solid adsorption alone.

The dry feed gas is passed in series flow through four heat exchangers by way of line 16, heat exchanger 18, line 20, heat exchanger 22, line 24, heat exchanger 26, line 28 and heat exchanger 30. Herein the dry feed gas is cooled by indirect heat exchange with cold gas and/or cold hydrogen sulfide. It is to be understood this arrangement is a matter of economy and other preliminary cooling means may be used.

The pre-cooled dry feed gas is passed from exchanger 30 by way of line 32 into vapor-liquid separator 34.

When the feed gas includes condensable hydrocarbons such as propane, butane, etc., these condense in the exchangers and may be separated by conventional means and withdrawn by way of valved lines 19 and 23.

It has ben discovered that when the cooled dry feed gas is at a temperature in the range of about −40° F. and about −120° F. and at an elevated pressure—related to temperature, only two phases are present, namely, a liquid hydrogen sulfide rich phase and a gaseous hydrocarbon phase having an $H_2S$ content lower than that of the feed gas. It is preferred to operate at a temperature in the range of about −80° F. and −120° F. at a pressure of at least about 200 p.s.i.a. In some cases, it is desirable to carry out this cooling at substantially constant elevated pressure, i.e., at substantially the feed gas pressure. When economic considerations permit, it is advantageous to operate at pressure well above 200 p.s.i.a. The temperature of the cooled feed determines largely the amount of hydrogen sulfide in the gaseous hydrocarbon phase. By proper temperature selection it is possible to have the $H_2S$ content of the gaseous hydrocarbon phase less than 5 mole percent. To illustrate for the more common feed gases, the approximate temperature and pressure relationship is: 200 p.s.i.a., −120° F.; 600 p.s.i.a., −117° F.; 700 p.s.i.a., −107° F.; 770 p.s.i.a., −100° F.

In the embodiment of the figure, the gas-liquid separation operation is carried out in two stages. In the two operations, the lower temperature is generally not lower than −115° F. A (first) gaseous hydrocarbon phase containing some $H_2S$ is withdrawn overhead from V-L separator 34 and this is passed through line 40, heat exchanger 42, line 44 into distillation zone 46.

A first liquid hydrogen sulfide phase containing dissolved hydrocarbon is withdrawn from V-L separator 34 and this is passed by way of line 60 and expansion valve 62 where it is expanded to the desired lower temperature and pressure. The expanded stream from valve 62 may be passed entirely by way of line 64 through heat exchanger 30 into line 66. When necessary to control the temperature produced in exchanger 30, a portion of the stream from valve 62 is bypassed by valved line 68 around exchanger 30 and sent directly to line 66. The stream in line 66 is passed through heat exchanger 26 and then by way of line 70 into V-L separator 72.

The cooled first liquid phase in line 70 is at a temperature in the range of about −50° F. and about −120° F. and is at a pressure of at least about 200 p.s.i.a. It is to be understood, the pressure of the cooled first liquid phase entering separator 72 is substantially lower than the pressure of the cooled charge (feed) gas to separator 34. The temperature of the cooled first liquid phase entering separator 72 is determined by the pressure and the desired low hydrocarbon content of the $H_2S$ rich stream withdrawn from separator 72.

Under the defined conditions of temperature and pressure, there exists in V-L separator 72 a second gaseous phase and a second liquid hydrogen sulfide phase. The second liquid phase is hydrogen sulfide containing some hydrocarbon—under these conditions the second liquid phase is pure enough to be charged to elemental sulfur production or even to many chemical reactions without further removal of hydrocarbons.

The second liquid hydrogen sulfide phase is withdrawn from separator 72 and passed by way of line 74 into expansion valve 76 where it is expanded to the desired pressure for subsequent use—usually close to atmospheric pressure. The expanded stream is passed by way of line 78, exchanger 22, line 80, exchanger 18 and line 82 to storage or disposal.

The second gaseous phase is withdrawn overhead from separator 72 and is passed by way of line 90, exchanger 18 and line 92 to compressor 94, where the stream is raised to the pressure desired for use. The gas stream from compressor 94 may be cycled in whole or in part by way of valved line 96 to line 16 and admixed with the feed gas from source 10 to become the charge gas stream, previously mentioned.

The material charged to zone 46 is distilled under conditions to produce an overhead gas fraction having a substantially lower hydrogen sulfide content than the material from line 44; this overhead fraction is withdrawn by way of line 100, passed through heat exchanger 102, from which a reflux stream is returned by way of line 104 to the upper part of zone 46. When the feed gas from source 10 contains about 10–25 mole percent of hydrogen sulfide and V-L separator 34 is operated at between about −80° F. to and −120° F. at a pressure of at least 200 p.s.i.a., zone 46 can readily produce an overhead gas fraction having a hydrogen sulfide content below about 0.5 mole percent. Details of this distillation are matters of ordinary skill. A liquid bottoms fraction is withdrawn from zone 46 by way of line 108. The bottoms fraction has a higher hydrogen sulfide content than the material charged by way of line 44. Preferably this material is passed back to V-L separator 34. Herein the bottoms fraction is passed by way of line 108, pump 110, line 112, heat exchanger 114, and line 116 to V-L separator 34. Temperature and pressure conditions of the bottoms fraction are adjusted to be at about those existing in V-L separator 34.

Distillation zone 46 is shown as producing a single overhead fraction; in cases where sufficient ethane (and ethylene) is present and there is a need to have an ethane product, this zone 46 can be operated to produce an overhead ethane fraction.

An internal refrigeration system 120 and an external refrigeration system 122 are provided in connection with distillation zone 46. The dashed lines and certain items of equipment unique to these systems are not numbered; their arrangement and function are matters of ordinary skill.

From heat exchanger 102, the overhead gas fraction produced in zone 46 is passed by way of line 130, exchanger 132, line 134, exchanger 26, line 138, exchanger 18, and line 140 to hydrogen sulfide clean-up unit 142.

Clean-up unit 142 may be any operation capable of lowering the hydrogen sulfide content of the overhead gas fraction to the desired level, usually to pipeline specifications. A conventional amine operation is suitable. The product gas is passed to the pipeline or other use by way of line 144.

*Illustration*

The operation of the process of the invention is illustrated by a unit charging 200 million s.c.f. of feed gas from source 10 per stream day—527 thousand moles; which feed gas is a natural gas containing 25 mole percent of $H_2S$ and the hydrocarbon is substantially only methane.

The feed gas is dehydrated to a water dew point of −100° F. by passage through an alumina unit or molecular sieve unit.

The feed gas is at 600 p.s.i.a.; it is passed through heat exchangers 18, 22, 26 and 30 into V-L separator 34 at substantially 600 p.s.i.a. The feed gas is at 80° F. and emerges from the exchangers at these temperatures: exchanger 18, +7° F.; exchanber 22, −28° F.; exchanger 26, −88° F. and exchanger 30, −100° F.; the cooled gas enters V-L separator 34 at −100° F. and 600 p.s.i.a. pressure.

A (first) liquid hydrogen sulfide rich phase, is withdrawn from separator 34. This stream contains 10.1 mole percent of dissolved hydrocarbon. After passing through expansion valve 62, the temperature is lowered to −120° F. at 200 p.s.i.a. After heat exchange in exchangers 30 and 26, the stream is passed into V-L separator 72 at −40° F. and about 200 p.s.i.a.

There exist in V-L separator 72 a second gaseous hydrocarbon phase having a $H_2S$ content of 24.6 mole percent. Here this second gaseous phase is withdrawn, compressed to 600 p.s.i.a. by compressor 94 and admixed with the feed gas in line 16 to give a combined gas stream which is passed to exchanger 18.

The second liquid hydrogen sulfide rich phase contains 1.2 mole percent of hydrocarbon and is passed out of the system at 22 p.s.i.a. and 60° F. and amounts to 133 thousand moles.

Under the above conditions of operation, it has been observed that a feed gas containing 5% or more mole percent of $H_2S$ produces a gaseous hydrocarbon phase in separator 34 having 4.6–4.9 mole percent of $H_2S$ percent.

The gaseous hydrocarbon stream from separator 34 enters distillation zone 46 at a temperature of $-119°$ F. and the zone is operated at 600 p.s.i.a. The bottoms fraction contains 6 mole percent of $H_2S$ and is passed back to separator 34. The overhead gas fraction leaves zone 46 at $-122°$ F. and contains 0.1 mole percent of $H_2S$. An amine trim unit cleans this to pipeline specification of 0.25 grain/100 s.c.f.

In another situation, feed gas from source 10 has an $H_2S$ content of 10 mole percent. Processing this feed gas to produce an overhead gas from distillation zone 46 of 0.1 mole percent of $H_2S$ content and product $H_2S$ having 1.8 mole percent hydrocarbon is accomplished as above except that V-L separator 72 is operated at $-70°$ F. and 200 p.s.i.a.

Thus having described the invention, what is claimed is:

1. A low temperature process for separating hydrogen sulfide from a normally gaseous hydrocarbon which process comprises:

cooling a feed gas mixture of hydrogen sulfide and at least one normally gaseous hydrocarbon, said mixture containing at least about 5 mole percent of hydrogen sulfide and being essentially free from water vapor, to a temperature in the range of about $-40°$ F. and $-120°$ F. at an elevated pressure such that a system consisting of gaseous hydrocarbon phase and liquid hydrogen sulfide phase is produced;

separating said gaseous hydrocarbon phase, which has a hydrogen sulfide content lower than said feed gas, from said liquid hydrogen sulfide phase, which contains some dissolved hydrocarbon;

cooling and partially condensing said gaseous hydrocarbon phase; and charging said cooled and partially condensed gaseous hydrocarbon phase to a distillation operation to produce a gaseous hydrocarbon overhead fraction of substantially lower hydrogen sulfide content than said gaseous hydrocarbon phase and a liquid bottoms fraction having a hydrogen sulfide content greater than said gaseous hydrocarbon phase; and withdrawing said liquid bottoms fraction and passing it to said separation operation.

2. The process of claim 1 wherein said feed gas has a water dew point below about $-100°$ F.

3. The process of claim 1 wherein said feed gas is a sour natural gas.

4. The process of claim 1 wherein said feed gas contains between about 5 and 60 mole percent of hydrogen sulfide and methane gas as the major hydrocarbon constituent.

5. The process of claim 1 wherein said cooled feed gas stream is at a temperature in the range of about $-80°$ F. and $-120°$ F., at a pressure of at least about 200 p.s.i.a.

6. The process of claim 1 wherein said feed gas contains about 10–60 mole percent of hydrogen sulfide and said gaseous hydrocarbon phase contains not more than about 5 mole percent of hydrogen sulfide.

7. A slow temperature process for separating hydrogen sulfide from a natural gas which process comprises:

cooling a natural gas feed containing about 10–60 mole percent of hydrogen sulfide and being essentially free of water vapor, to a temperature in the range of about $-80°$ F. and $-120°$ F. at a pressure of at least about 200 p.s.i.a., to obtain a system consisting of gaseous hydrocarbon phase and liquid hydrogen sulfide rich phase;

separating said liquid hydrogen sulfide rich phase from said gaseous hydrocarbon phase containing hydrogen sulfide in an amount less than in said feed;

cooling said liquid hydrogen sulfide rich phase to a temperature in the range of about $-50°$ F. and about $-120°$ F., at a pressure of at least about 200 p.s.i.a., where the pressure of said cooled liquid hydrogen sulfide rich phase is lower than the pressure of said cooled feed gas;

separating a second liquid hydrogen sulfide phase having a $H_2S$ content greater than that of said liquid hydrogen sulfide rich phase from a second gaseous hydrocarbon phase;

cooling and partially condensing said gaseous hydrocarbon phase; and charging said cooled and partially condensed gaseous hydrocarbon phase to a distillation operation under conditions to produce an overhead gas fraction having a hydrogen sulfide content below about 0.5 mole percent, and a bottoms fraction having a hydrogen sulfide content greater than said gaseous hydrocarbon phase.

8. The process of claim 7 wherein said bottoms fraction is compressed to the pressure of said gas liquid separation operation and cooled to the temperature of said liquid gas separation operation and is thereafter passed to said gas-liquid separation operation, at about the temperature and pressure thereat.

9. A low temperature process for separating hydrogen sulfide from a normally gaseous hydrocarbon which process comprises:

cooling a feed gas mixture of hydrogen sulfide and at least one normally gaseous hydrocarbon, said mixture containing at least about 5 mole percent of hydrogen sulfide and being essentially free of water vapor, to a temperature in the range of about $-40°$ F. and about $-115°$ F., at an elevated pressure substantially the same as that of said feed gas;

separating a liquid hydrogen sulfide rich phase containing dissolved hydrocarbon from a gaseous hydrocarbon phase, said gaseous hydrocarbon phase having a hydrogen sulfide content lower than that of said feed gas;

cooling said liquid hydrogen sulfied rich phase to a temperature in the range of about $-50°$ F. and about $-120°$ F., at a pressure of at least about 200 p.s.i.a, where the pressure of said cooled liquid hydrogen sulfide rich phase is lower than the pressure of said cooled feed gas;

separating a second liquid hydrogen sulfide phase having a $H_2S$ content greater than that of said liquid hydrogen sulfide rich phase from a second gaseous hydrocarbon phase;

cooling and partially condensing said gaseous hydrocarbon phase;

charging said cooled and partially condensed gaseous hydrocarbon phase to a distillation operation under conditions to produce an overhead gas fraction having a hydrogen sulfide content lower than said gaseous hydrocarbon phase and a bottoms fraction having a hydrogen sulfide centent greater than said gaseous hydrocarbon phase; and separating overhead gas fraction from said bottoms fraction.

10. The process of claim 9 wherein said second gaseous hydrocarbon phase is cycled to said feed gas and the combined charge is then cooled for the first gas-liquid separation.

11. The process of claim 9 wherein said feed gas contains about 25 mole percent of hydrogen sulfide, said feed gas is cooled to about −100° F. at about 600 p.s.i.a, said liquid hydrogen sulfide rich phase is cooled to about −40° F. at about 200 p.s.i.a., said distillation is at about 600 p.s.i.a. and said overhead gas fraction has an hydrogen sulfide content below about 0.5 mole percent.

12. The process of claim 9 wherein said feed gas contains about 10 mole percent of hydrogen sulfide, said feed gas is cooled to about −100° F. at about 600 p.s.i.a., said liquid hydrogen sulfide rich phase is cooled to about −70° F. at about 200 p.s.i.a., said distillation is at about 600 p.s.i.a. and said overhead gas fraction has an hydrogen sulfide content below about 0.5 mole percent.

References Cited by the Examiner

UNITED STATES PATENTS

| | | | |
|---|---|---|---|
| 2,901,326 | 8/1959 | Kurata et al. | 62—12 X |
| 2,940,271 | 6/1960 | Jackson | 62—23 X |
| 3,181,307 | 5/1965 | Kuerston | 62—23 |
| 3,205,669 | 9/1965 | Grossmann | 62—23 |

FOREIGN PATENTS 659,432    3/1963    Canada.

NORMAN YUDKOFF, *Primary Examiner.*

V. W. PRETKA, *Assistant Examiner.*